United States Patent
Huang et al.

(10) Patent No.: US 9,306,663 B2
(45) Date of Patent: Apr. 5, 2016

(54) CONTROLLER, A COMMUNICATION SYSTEM, A COMMUNICATION METHOD, AND A STORAGE MEDIUM FOR STORING A COMMUNICATION PROGRAM

(75) Inventors: Shaowei Huang, Tokyo (JP); Itaru Nishioka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 104 days.

(21) Appl. No.: 14/128,291

(22) PCT Filed: Jun. 23, 2011

(86) PCT No.: PCT/JP2011/064989
§ 371 (c)(1),
(2), (4) Date: Dec. 20, 2013

(87) PCT Pub. No.: WO2012/176340
PCT Pub. Date: Dec. 27, 2012

(65) Prior Publication Data
US 2014/0112655 A1    Apr. 24, 2014

(51) Int. Cl.
*H04B 10/08* (2006.01)
*H04B 10/079* (2013.01)
*H04J 14/02* (2006.01)

(52) U.S. Cl.
CPC ...... *H04B 10/0791* (2013.01); *H04B 10/07951* (2013.01); *H04B 10/07953* (2013.01); *H04J 14/0291* (2013.01)

(58) Field of Classification Search
CPC .................. H04B 10/0791; H04B 10/07951; H04B 10/07953
See application file for complete search history.

(56) References Cited

U.S. PATENT DOCUMENTS

| 6,873,601 B1* | 3/2005 | Chow et al. .................. 370/254 |
| 2005/0111350 A1 | 5/2005 | Kano |

(Continued)

FOREIGN PATENT DOCUMENTS

| EP | 1 710 934 A1 | 10/2006 |
| JP | 2002-271267 A | 9/2002 |

(Continued)

OTHER PUBLICATIONS

J.P. Lang et al., "RSVP-TE Extensions in support of End-to-End Generalized Multi-Protocol Label Switching (GMPLS) Recovery", Network Working Group, IETF RFC 4872, May 2007. [Internet] retrieved on Dec. 2, 2013, URL: <http://www.packetizer.com/rfc/rfc4872/?format=txt>.
International Search Report for PCT Application No. PCT/JP2011/064989, mailed on Mar. 13, 2012.

*Primary Examiner* — Dzung Tran

(57) ABSTRACT

[Technical Problem]
Placing optical performance monitors at all of nodes and links in a network results in a high monitoring capital expenditure (CAPEX).
[Solution to Problem]
A controller connected to a network and a plurality of nodes includes: a first degraded path detecting means for detecting a wavelength path as a first degraded path, whose quality is detected to be degraded, based on received parameter of wavelength paths in the network; a correlation path computation means for computing a correlation path which is correlated to the first degraded path; a second degraded path detecting means for detecting a second degraded path from the correlation path; and a failure localization means for localizing a node or a link connecting nodes as a failure node or a failure link, wherein the node or the link are traversed by both of the first degraded path and the second degraded path.

20 Claims, 14 Drawing Sheets

(56) References Cited

U.S. PATENT DOCUMENTS

2010/0067899 A1* 3/2010 Li et al. .............................. 398/1
2012/0224851 A1* 9/2012 Takara et al. ................... 398/45
2012/0237207 A1* 9/2012 Caviglia et al. ................ 398/25

FOREIGN PATENT DOCUMENTS

| JP | 2006-60571 A | 3/2006 |
| JP | 2008-166935 A | 7/2008 |

* cited by examiner

FIG.12

| | WP-A | WP-B | WP-C |
|---|---|---|---|
| Link (101, 102) | 1 | 1 | 0 |
| Link (102, 103) | 1 | 0 | 1 |
| Link (102, 105) | 0 | 0 | 0 |
| Link (103, 104) | 0 | 0 | 1 |
| Link (104, 105) | 0 | 1 | 0 |
| Link (105, 101) | 0 | 1 | 0 |

Link table 801

FIG.13

Parameter table 802

| | | WP-A | WP-B | WP-C |
|---|---|---|---|---|
| BER | Average | $10^{-5}$ | $10^{-6}$ | $10^{-6}$ |
| | Actual | $10^{-3}$ | $10^{-4}$ | $10^{-7}$ |
| Accumulated CD | Average | 32000 ps/nm | 38000 ps/nm | 24000 ps/nm |
| | Actual | 31980 ps/nm | 39030 ps/nm | 23000 ps/nm |
| PMD | Average | 38 ps | 34 ps | 20 ps |
| | Actual | 42 ps | 48 ps | 21 ps |

CONTROLLER, A COMMUNICATION SYSTEM, A COMMUNICATION METHOD, AND A STORAGE MEDIUM FOR STORING A COMMUNICATION PROGRAM

This application is a National Stage Entry of PCT/JP2011/064989 filed on Jun. 23, 2011, the content of which is incorporated herein by reference, in their entirety.

TECHNICAL FIELD

The present invention relates to a controller, a communication system, a communication method, and a storage medium for storing a communication program, which are used in a communication network.

BACKGROUND ART

Wavelength division multiplexing (WDM) technology provides a method of accommodating different wavelength channels in a same fiber.

The channel taking optical signal through the network is referred to wavelength channel. Recently, advanced optical transmission technology has been developed to support high-speed transmission up to 100 Gbps (Giga bit per second) for a single wavelength channel.

As known so far, optical signal degradation can be caused by physical impairments in optical layer, such as, amplifier spontaneous emission (ASE), chromatic dispersion (CD), polarization mode dispersion (PMD) and nonlinearities, etc. The physical impairments mentioned above eventually results in bit errors at receivers of the wavelength channels. With an increase of transmission speed per wavelength channel, optical signals become more vulnerable to physical impairments. In order to realize high reliability in WDM networks, protection mechanism is desired to prevent the optical signals from unintended errors.

Fault management provides such protection mechanism for WDM networks in non patent literature 1. In general, the protection mechanism includes four procedures: failure detection, failure notification, failure localization, and failure recovery.

In failure detection, failures can be identified as signal failure (SF) or signal degradation (SD) by the deployment of optical power level monitors or optical performance monitors. In particular, optical performance monitors can provide monitoring results presented by optical signal noise ratio (OSNR), CD or PMD etc., which can be used to monitor physical impairments. Failure notification may come after the failure detection, which is used to inform the deciding entities to a failure caused by SF or SD. The deciding entities can be the ones making failure recovery decisions. The failure notification can be provided by the optical layer or a control plane. A control plane is a plane or a network, which is used to perform wavelength path configuration. In non patent literature 1, a notifying mechanism is realized by using a generalized multi-protocol label switching (GMPLS)-based control plane. Failure localization provides the information to the deciding entities about the place at which failure occurs. The place may be a node or a link between nodes.

Based on this information, the deciding entity can then make an accurate decision to reroute the traffic to avoid passing the nodes or the links at which failure occurs. On receiving the failure notification, the deciding entity will perform failure recovery to reroute the affected traffic.

A proposal for localizing failure caused by signal degradation is disclosed in Patent Literature 1. In patent literature 1, optical performance monitors are placed at all optical switching equipments (e.g., re-configurable optical add/drop multiplexers (ROADM), wavelength cross-connects (WXC)) or along the fiber link for monitoring all wavelength channels traversing a fiber link. Based on the monitor location information, location of the failure caused by signal degradation can be figured out.

For other related technology, patent literature 2 and patent literature 3 are described as follows.

Patent literature 2 discloses a method of failure detection of a path through which a testing signal passed, by loop-backing the testing signal at nodes on the paths.

Patent literature 3 discloses a method for computing wavelength path group, which would be influenced when signal degradation occurs, based on monitoring results obtained by wavelength dispersion monitors, which are set arbitrarily in a network, and wavelength path information is kept by a network management system (NMS).

CITATION LIST

Patent Literature

[Patent Literature 1] Japanese Patent Application Laid-Open No. 2008-166935
[Patent Literature 2] Japanese Patent Application Laid-Open No. 2002-271267
[Patent Literature 3] Japanese Patent Application Laid-Open No. 2006-060571

Non Patent Literature

[Non Patent Literature 1] J. P. Lang et al., "RSVP-TE Extensions in support of end-to-end GMPLS recovery", IETF RFC 4872, May 2007.

SUMMARY OF INVENTION

Technical Problem

As described above, the optical performance monitors are placed at all nodes or the links in patent literature 1. However, since optical performance monitor is expensive, placing optical performance monitors at all optical switching equipments for monitoring all wavelength channels results in a high monitoring capital expenditure (CAPEX).

Furthermore, the localizing is no need to be as much accurate as in patent literature 1, since it is sufficient for use in actual network to localize the place where failure occurs as plural possible place. Therefore, the method described in patent literature 1 needs too much monitoring CAPEX.

The present invention is conceived in consideration of the above mentioned circumstances, and an object of the present invention is to provide a controller, a communication system, a communication method, and a storage medium for storing a communication program.

Solution to Problem

A controller connected to a network and a plurality of nodes includes: a first degraded path detecting means for detecting a wavelength path as a first degraded path, whose quality is detected to be degraded, based on received parameter of wavelength paths in the network; a correlation path computation means for computing a correlation path which is correlated to the first degraded path; a second degraded path detecting means for detecting a second degraded path from the correlation path; and a failure localization means for localizing a node or a link connecting nodes as a failure node or a failure link, wherein the node or the link are traversed by both of the first degraded path and the second degraded path.

A communication system includes: a network including a plurality of nodes connected each other by a link; a monitoring means for monitoring parameter related to quality of wavelength paths through the nodes; a first degraded path detecting means for detecting a wavelength path as a first degraded path, whose quality is detected to be degraded, based on the parameter monitored; a correlation path computation means for computing a correlation path which is correlated with the first degraded path; a second degraded path detecting means for detecting a degraded path as a second degraded path from the correlation path; and a failure localization means for localizing a node or a link as a failure node or a failure link, wherein the node or the link are traversed by both of the first degraded path and the second degraded path.

A communication method includes: detecting a wavelength path as a first degraded path, whose quality is detected to be degraded, based on received parameter of wavelength paths in a network; computing a correlation path which is correlated to the first degraded path; detecting a second degraded path from the correlation path; and localizing a node or a link connecting nodes as a failure node or a failure link, wherein the node or the link are traversed by both of the first degraded path and the second degraded path.

A storage medium for storing a communication program includes: a first degraded path detecting process for detecting a wavelength path as a first degraded path, whose quality is detected to be degraded, based on received parameters of wavelength paths in the network; a correlation path computation process for computing a correlation path which is correlated to the first degraded path; a second degraded path detecting process for detecting a second degraded path from the correlation path; and a failure localization process for localizing a node or a link connecting nodes as a failure node or a failure link, wherein the node or the link are traversed by both of the first degraded path and the second degraded path.

Advantageous Effects of Invention

According to the present invention, there would be no need to place optical performance monitors at all of nodes and links in a network. Therefore, the present invention is able to localize where signal degradation failure occurs, while the present invention lowering cost down.

BRIEF DESCRIPTION OF DRAWINGS

FIG. 12 is showing a link table in the second exemplary embodiment.

FIG. 13 is showing a parameter table in the second exemplary embodiment.

DESCRIPTION OF EMBODIMENTS

Hereinafter, the exemplary embodiments of the present invention are described in detail with reference to accompanying drawings.

First Exemplary Embodiment

Configuration of the First Exemplary Embodiment

Figure 1:
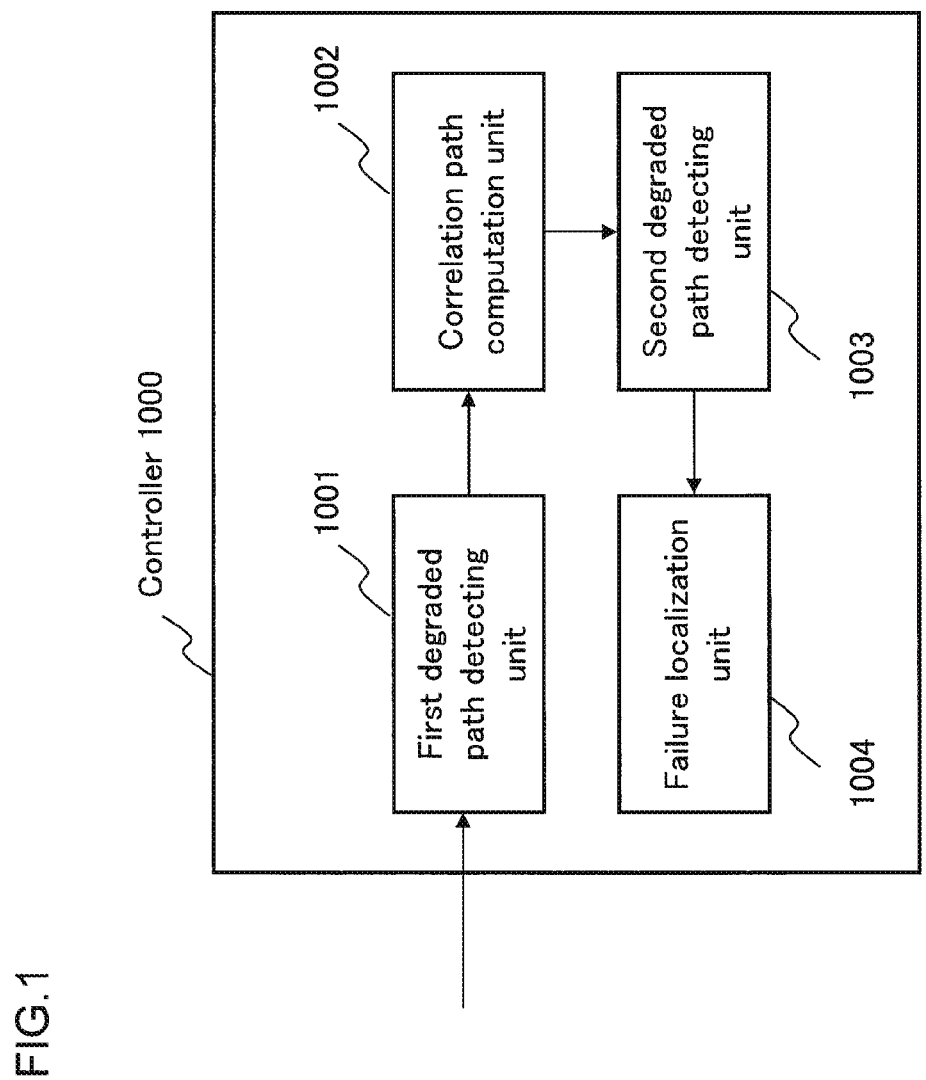
FIG. 1 is a block diagram showing a configuration of a controller in the first exemplary embodiment.

FIG. 1 shows a configuration of a controller 1000.

According to FIG. 1, the controller 1000 includes a first degraded path detecting unit 1001, a correlation path computation unit 1002, a second degraded path detecting unit 1003, and a failure localization unit 1004.

The first degraded path detecting unit 1001 receives result of monitoring parameters related to quality of wavelength paths, via network connected to the controller 1000. Then, the first degraded path detecting unit 1001 detects a path, of which its parameters are degraded, as a first degraded path, based on the received monitoring result.

The correlation path computation unit 1002 computes a correlation path which is correlated with the first degraded path.

The second degraded path detecting unit 1003 detects a degraded path as a second degraded path from the correlation path.

The failure localization unit 1004 localizes a node or a link as a failure node or a failure link, wherein the node or the link are traversed by both of the first degraded path and the second degraded path.

(Operation of the First Exemplary Embodiment)

Figure 2:
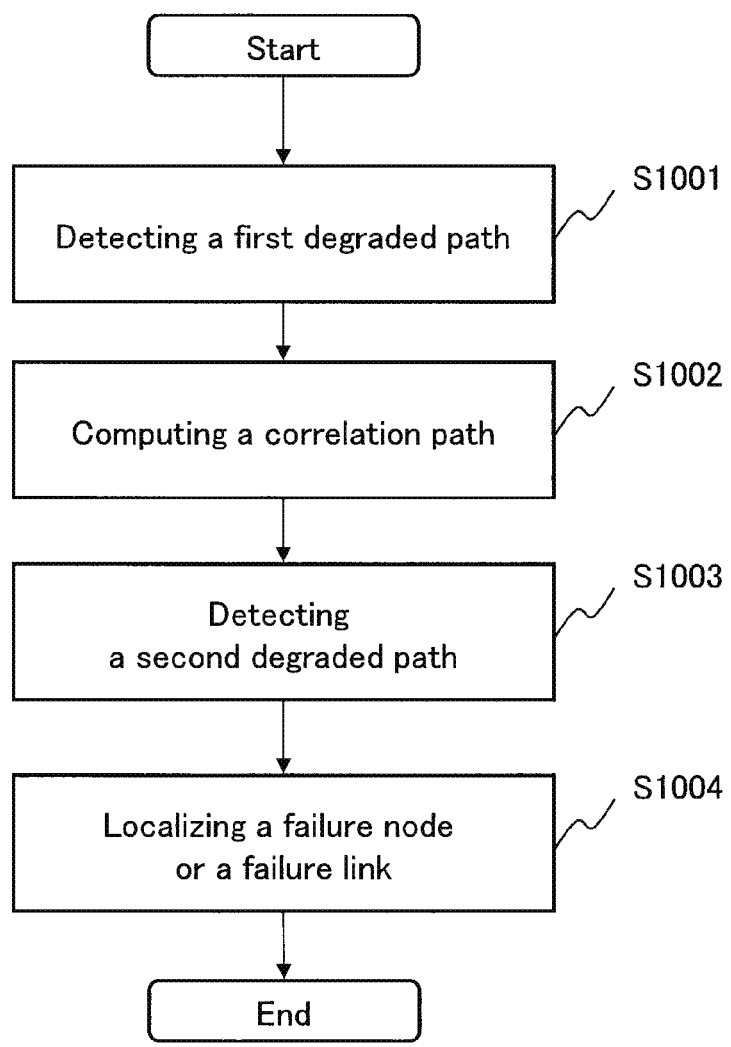
FIG. 2 is a flow chart showing an operation in the first exemplary embodiment.

FIG. 2 shows an operation performed by the controller 1000. The operation carried out by the controller 1000 and each of the elements in the controller 1000 will be described in the following.

First, the first degraded path detecting unit 1001 detects a path, of which its parameters related to its quality is degraded, as a first degraded path, based on received monitored parameters of wavelength paths (S1001).

Then, the correlation path computation unit 1002 computes a correlation path which is correlated with the first degraded path detected in S1001 (S1002).

Next, the second degraded path detecting unit 1003 detects a degraded path from the correlation path computed in the step S1002, as a second degraded path (S1003).

Finally, the failure localization unit 1004 localizes a node or a link as a failure node or a failure link (S1004). The failure node and the failure link are traversed by both of the first degraded path and the second degraded path.

(Effect Caused by the First Exemplary Embodiment)

According to the description above, the controller 1000 localizes a failure node or a failure link by detection of the first degraded path and computation of the second degraded path, which is correlated with the first degraded path.

Therefore, according to the first exemplary embodiment, there would be no need to place optical performance monitors at all of nodes and links in a network. Therefore, the present invention is able to localize where signal degradation failure occurs, while the present invention lowering cost down.

Second Exemplary Embodiment

Hereinafter, a second exemplary embodiment is described in detail.

(Configuration of the Second Exemplary Embodiment)

Figure 3:
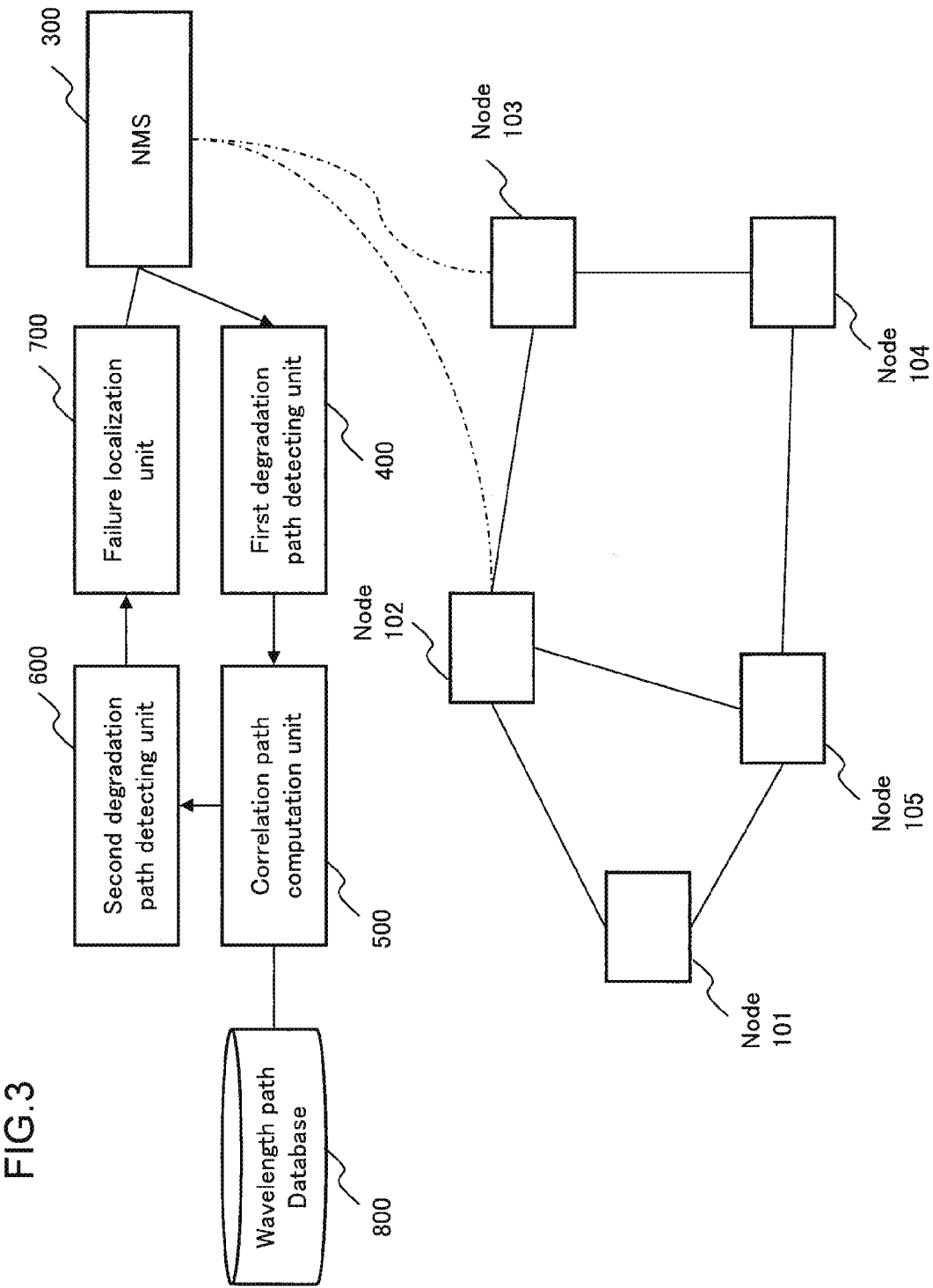
FIG. 3 is a block diagram showing a configuration of a communication system in the second exemplary embodiment.

FIG. 3 shows a block diagram of a configuration of a WDM network. According to FIG. 3, a WDM network includes nodes 101 to 105, a network management system (NMS) 300, a first degradation path detecting unit 400, a correlation path computation unit 500, a second degradation path detecting unit 600, a failure localization computation unit 700, and a wavelength path database (WP DB) 800.

The NMS 300 manages the WDM network. For example, the NMS 300 manages the wavelength resources and makes failure recovery decision. The NMS 300 also retrieves the signal degradation information from the receiver nodes of the wavelength paths on-demand or periodically.

In FIG. 3, the NMS 300 is connected to the nodes 101 to 105, and manages their communication status via wavelength paths. For simplicity of the figure, only the connections between the NMS 300 and the nodes 102 and 105 are shown in FIG. 3, but the NMS 300 is connected to the nodes 101, 103 and 104, which are not shown in FIG. 3.

The first degradation path detecting unit 400 receives the results of monitoring at each of the nodes from the NMS 300. Then, the first degradation path detecting unit 400 detects a first degraded path. The first degraded path is that the path, of which its parameter related to its quality is degraded.

The first degradation path detecting unit 400 may be omitted in the case that the nodes 101 to 105 are able to detect the first degraded path by themselves.

The correlation path computation unit 500 computes a correlation path. The correlation path is the path correlated with a first degraded path.

The second degradation path detecting unit 600 computes a second degradation path from the correlation path computed by the correlation path computation unit 500.

The failure localization unit 700 computes where the failure occurs and figures out the physical impairments causing bit errors.

Figure 5:
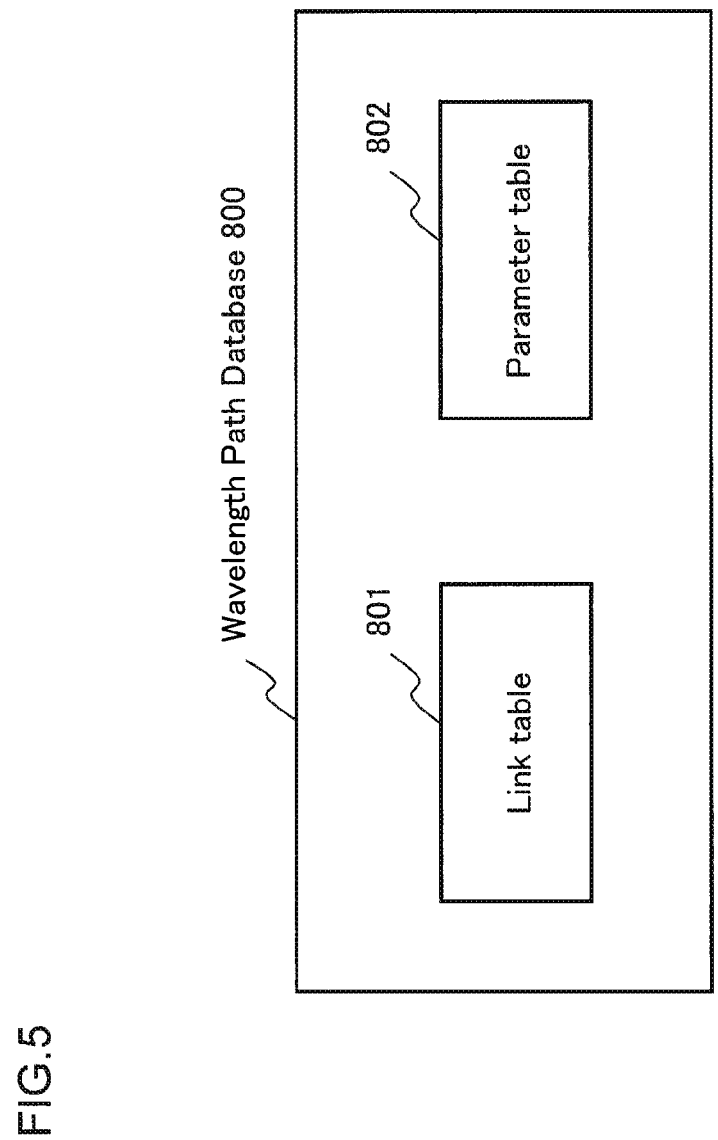
FIG. 5 is a block diagram showing a configuration of a wavelength path database in the second exemplary embodiment.

The wavelength path database 800 memorizes states of each of the links, and parameters related to the wavelength paths. FIG. 5 shows a configuration of the wavelength path database 800. According to FIG. 5, the wavelength path database 800 includes a link table 801 and a parameter table 802. Both of them will be described in detail in the following description.

The nodes 101 to 105 are connected by bi-directional linked optical fibers, in which optical signals may be transmitted in opposite directions. Optical signals transmitted in the same direction are carried by different wavelengths. Each of the nodes 101 to 105 is a type of network elements (NEs) which is capable of switching wavelength paths, for example, ROADM (Reconfigurable Optical Add/Drop Multiplexer) and WXC (Wavelength Cross Connect).

The details of the nodes 101 to 105 and the units above will be described later.

A wavelength path in the optical network in FIG. 3 may be a wavelength path carrying optical signal transmitted at one of the nodes 101 to 105 and received at another node 101 to 105. A wavelength path may traverse more than one of the nodes 101 to 105 along the optical fibers, but it can only occupy one wavelength in every optical fiber. For simplicity, a few number of the wavelength paths will be given in the following description.

Figure 4:
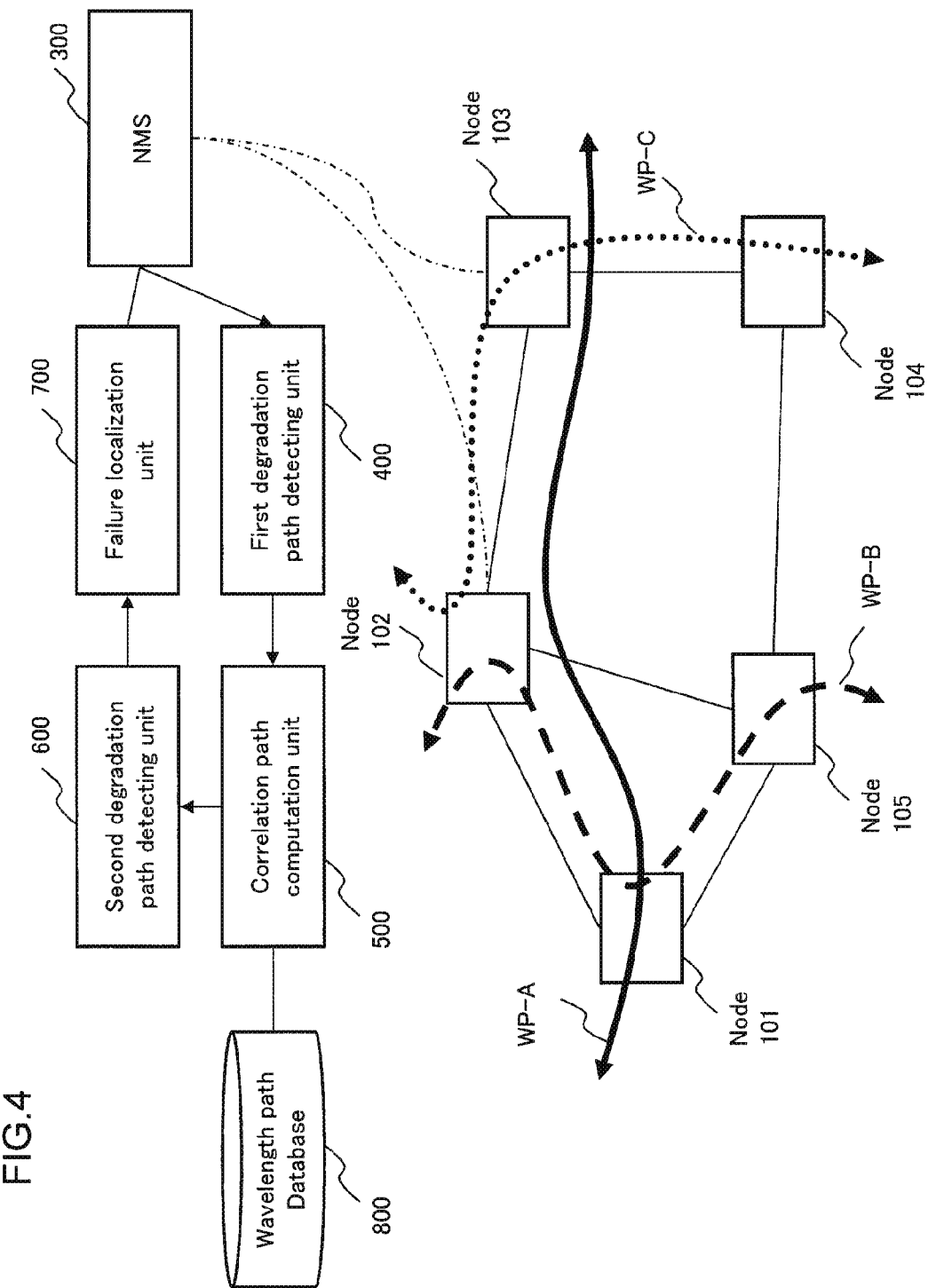
FIG. 4 is a block diagram showing a configuration of a communication system in the second exemplary embodiment.

For example, a wavelength path WP-A between the node 101 and the node 103 is shown in FIG. 4. In general, it is a bi-directional wavelength path, but only one direction is drawn in FIG. 4 for simplicity. Along the path WP-A, the nodes 101, 102, and 103 are passed. Also, along the path WP-A, optical fibers (links) between node pairs (101, 102) and (102, 103) are traversed. A wavelength path WP-B and WP-C are also shown in FIG. 4. Along the path WP-B, the nodes 102, 101, and 105 are passed, and optical fibers between node pairs (102, 101) and (101, 105) are traversed. Along the path WP-C, the nodes 104, 103, and 102 are passed, and optical fibers between node pairs (104, 103) and (103, 102) are traversed.

Figure 6:
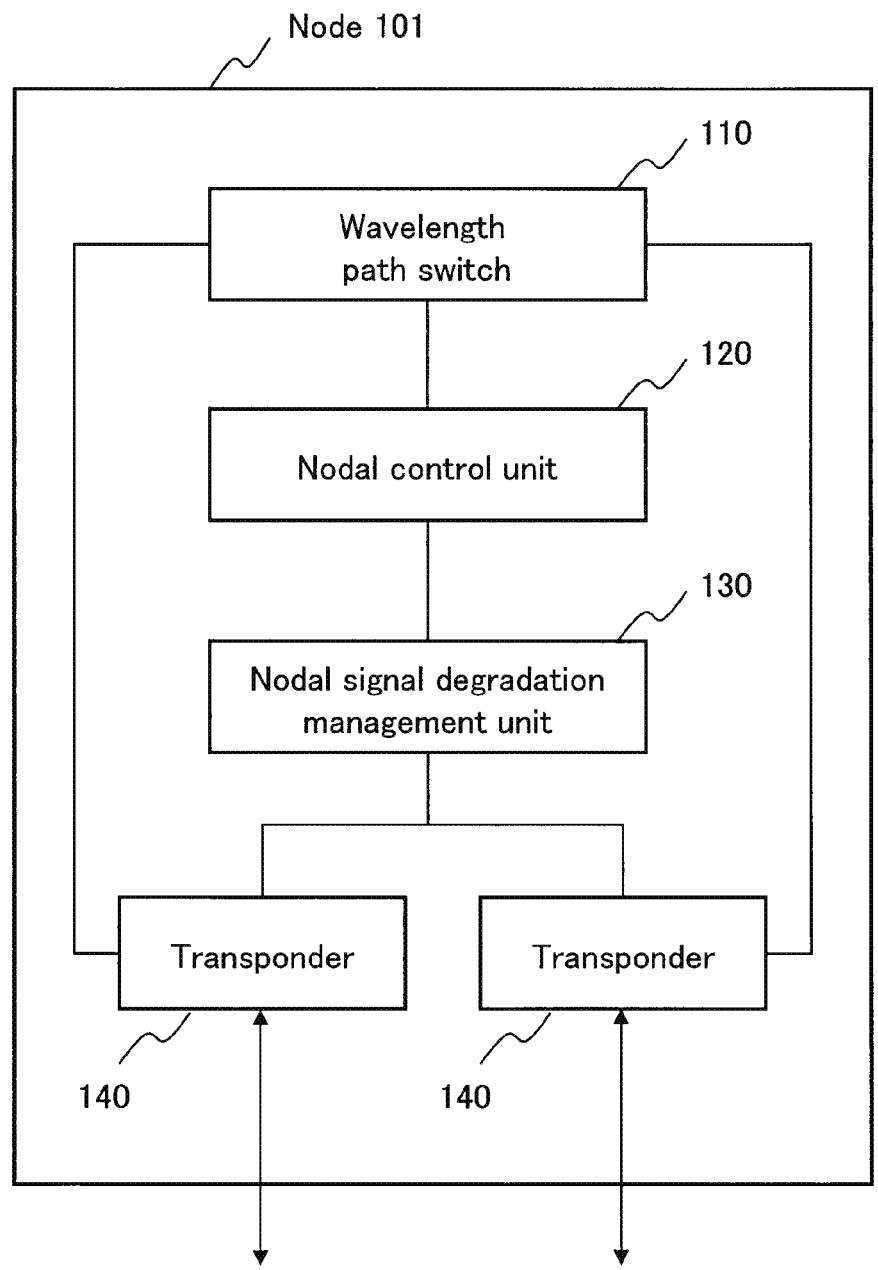
FIG. 6 is a block diagram showing a configuration of a node in the second exemplary embodiment.

A structure of the node 101 is shown in FIG. 6. According to FIG. 6, the node 101 includes wavelength path switch 110, a nodal control unit 120, a nodal signal degradation management unit 130, and transponder 140. As described above, the node 101 is connected to the other nodes via optical fibers. The optical fibers are connected to the transponder 140. The other nodes 102 to 105 have the same structure to the node 101, therefore the structures of the other nodes are omitted. Furthermore, although it is not shown in FIG. 6, the optical fibers connecting the nodes may include a plurality of in-line amplifier.

The wavelength path switch 110 switches a wavelength path at the node 101 from one input optical fiber to another output optical fiber, via the transponder 140.

In the first exemplary embodiment, two types of transponders 140 are considered. One is a transponder without digital coherent transceivers; the other is a transponder with digital coherent transceivers.

Figure 7:
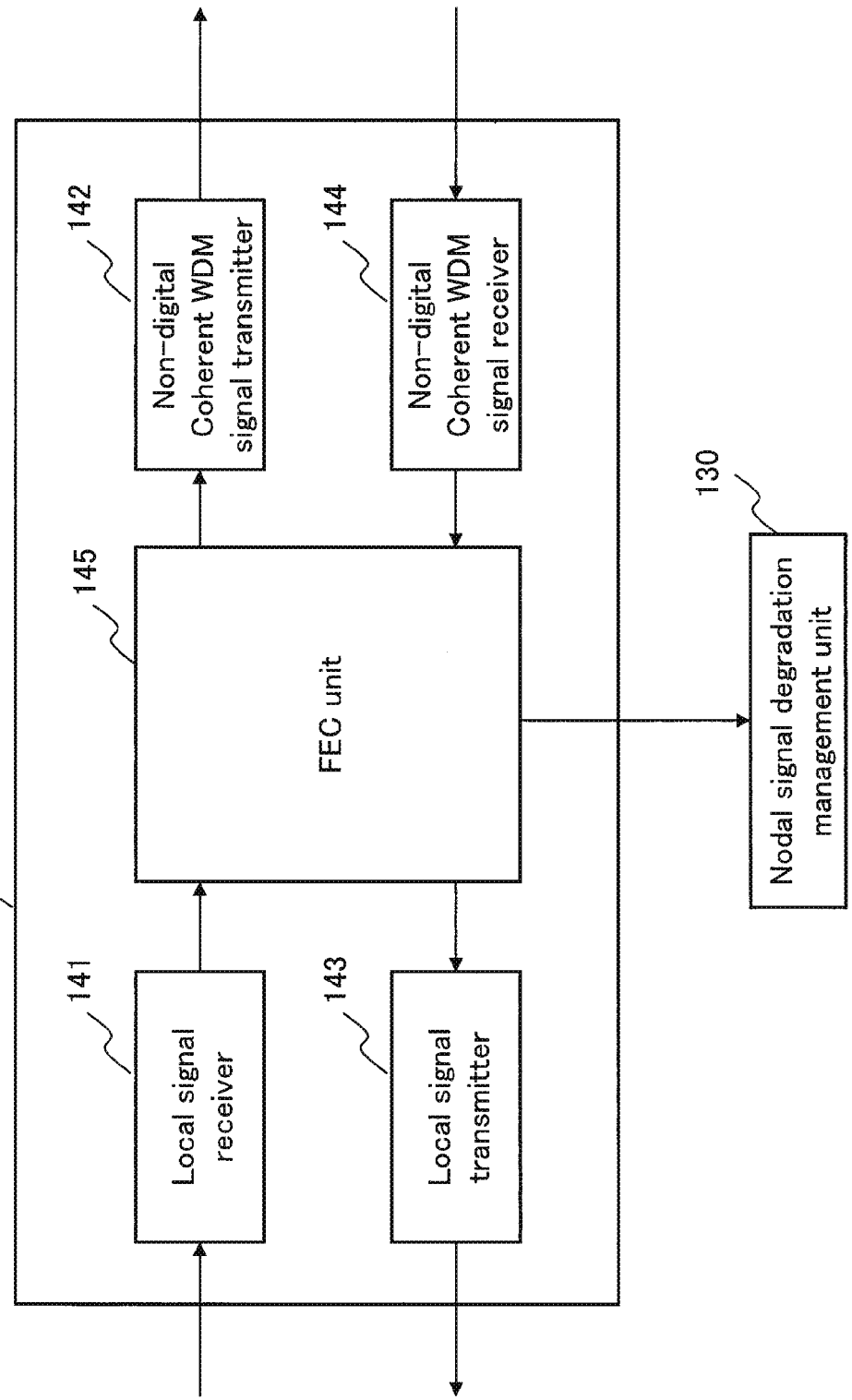
FIG. 7 is a block diagram showing a configuration of a transponder in the second exemplary embodiment, without digital signal processing function.

A structure of the former transponder is shown in FIG. 7. The transponder 140 is used to transmit and receive optical signal for a wavelength path. According to FIG. 7, the transponder 140 includes a non-digital coherent WDM signal transmitter 142, a non-digital coherent WDM receiver 144, a forward error correction (FEC) unit 145, a local signal receiver 141, and a local signal transmitter 143.

WDM signals are received by the non-digital coherent WDM receiver 144. Then the WDM signals are transmitted by the non-digital coherent WDM transmitter 142. Input client signals are received in the local signal receiver 141. Then the input client signals are transmitted by the local signal transmitter 143. The format of the client signal may be Gigabit Ethernet (Registered) (GbE), 10 GbE, STM (Synchronous Transport Module)-4/16/64 or OC (Optical Carrier)-12/48/192, etc.

In the FEC unit 145, bits which encounter errors may be corrected. More corrected bits mean more errors and worse signal degradation condition. Bit error rate (BER) may be calculated as the ratio of the number of corrected bits to the total bits received during a given period of time. The BER information is to be sent to the nodal signal degradation management unit 130. In this type of transponder, it is impossible to know what causes errors to happen.

A structure of the latter transponder, a transponder with digital coherent transceivers, mentioned above is shown in FIG. 8. The transponder 140 is used to transmit and receive optical signal for a wavelength path. According to FIG. 8, the transponder 140 includes a digital coherent optical WDM signal transmitter 242, a digital coherent optical WDM receiver 244, a digital signal processing (DSP) and FEC unit 245, a local signal receiver 241, and a local signal transmitter 243.

WDM signals are received by the digital coherent optical WDM signal receiver 244. Then the WDM signals are transmitted by the digital coherent optical WDM signal transmitter 242. Input client signals are received in the local signal receiver 241. Then the input client signals are transmitted by the local signal transmitter 243. The format of the client signal may be GbE, 10 GbE, STM-4/16/64 or OC-12/48/192, etc.

The differences from the transponder without digital coherent transceiver are described as follows. The first difference is that the WDM signals processed by the transceivers are modulated by optical amplitude, frequency or phase. The second difference is that, since demodulation of the coherent optical signals is required, the structure of the transceiver is more complex than that of the non-digital coherent transceiver of 142 and 144.

In coherent optical communications, digital signal processing (DSP) module may be paired with digital coherent optical WDM signal receiver 244. The DSP is a technique that is used to de-modulate the optically modulated signals which are received by the coherent optical receiver. Currently, analog-digital (A/D) conversion in the DSP module makes it possible to digitally compensate physical impairments such as CD, PMD. Therefore, the signal degradation caused by CD or PMD may be estimated by the DSP module.

In the DSP and FEC unit 245, physical impairments are separated by adopting some signal processing algorithm and mitigated in the equalizer. In the second exemplary embodiment, the information of physical impairments such as CD and PMD is sent to the nodal signal degradation management unit 130. The CD or PMD is the average value computed by the DSP and FEC unit 245 during a given period of time.

In this type of transponder, the DSP and FEC unit 245 may function as an optical performance monitor and multiple physical impairments can be separated and monitored, which brings great advantages to reduce the monitoring costs.

Figure 9:
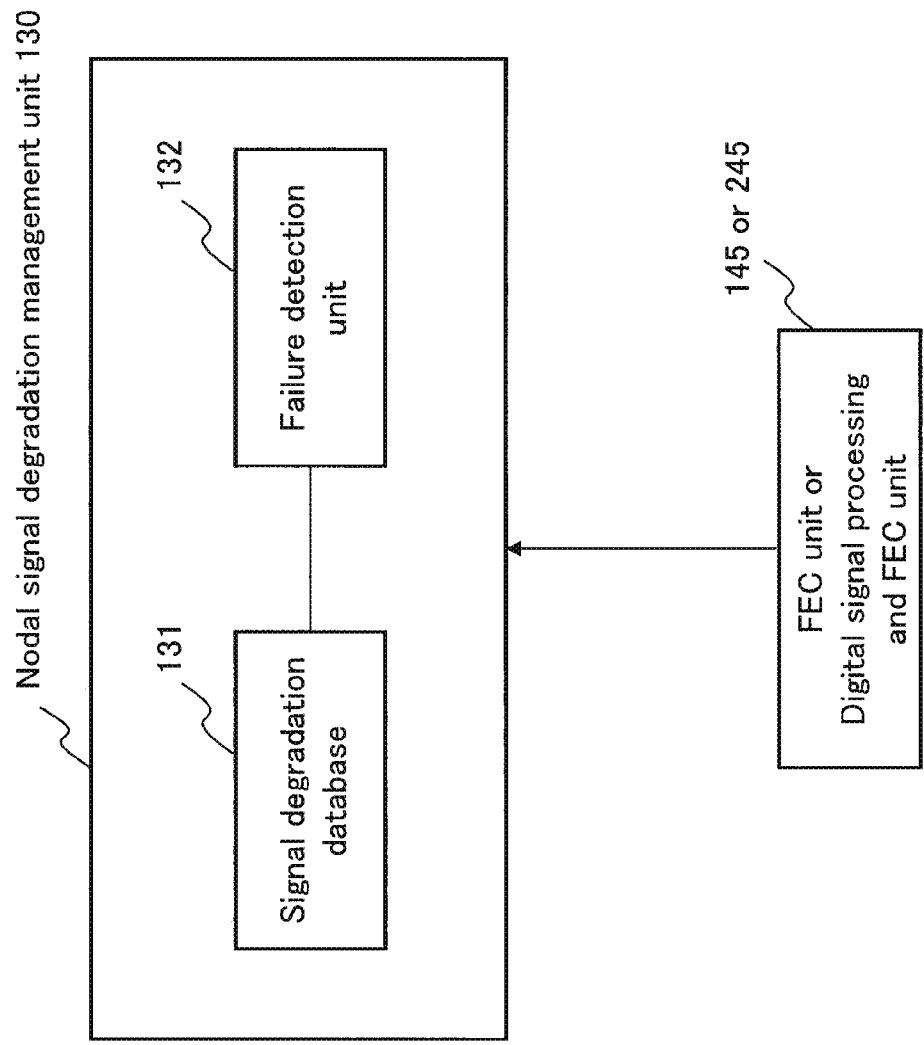
FIG. 9 is a block diagram showing a configuration of a nodal signal degradation unit in the second exemplary embodiment.

As shown in FIG. 9, the nodal signal degradation management unit 130 includes a signal degradation database 131 and a failure detection decision unit 132. On receiving the statistical information including the corrected bits from the FEC unit 145 or the DSP and FEC unit 245, the nodal signal degradation management unit 130 updates its signal degradation database 131. The failure detection decision unit 132 may decide whether to notify the NMS 300 or not, by comparing the received statistical information with the preset signal degradation threshold value.

The failure detection unit 132 may use some algorithm to decide whether the failure detection unit 132 should notify the NMS 300. The algorithm may use a threshold value of signal quality. For example, a threshold value X is set in the failure detection unit 132. And Y is the value of BER sent by the FEC unit 145 or CD/PMD value sent by the DSP and FEC unit 245. If Y>X, the nodal signal degradation management unit 130 informs the nodal control unit 120 a detection of signal degradation. Then the nodal control unit 120 notifies the NMS 300 a signal degradation failure.

Furthermore, the nodal signal degradation management unit 130 may be omitted in the case that the first degradation path detecting unit 400 in FIG. 3 and FIG. 4 is set in the network, since the first degradation path detecting unit 400 detects the first degradation path.

(Operation of the Second Exemplary Embodiment)

Hereinafter, an operation of the second exemplary embodiment will be described with reference to accompanying figures.

At first, every wavelength paths are monitored to measure the parameters, which may cause physical impairments, and average value of the parameters are computed in a long term. The parameters may be accumulated CD, PMD, nonlinear effect, or OSNR as described above.

An operation of failure localization based on the average values, when signal degradation is detected in a wavelength path, will be described in the following. In addition, the operation is different between the types of the transponder 140, whether it is with digital coherent transceivers or not. Operations by both of the transponders will be described in the following. Furthermore, it is supposed that the transponder 140 is included in the node 101, in the following description.

Figure 10:
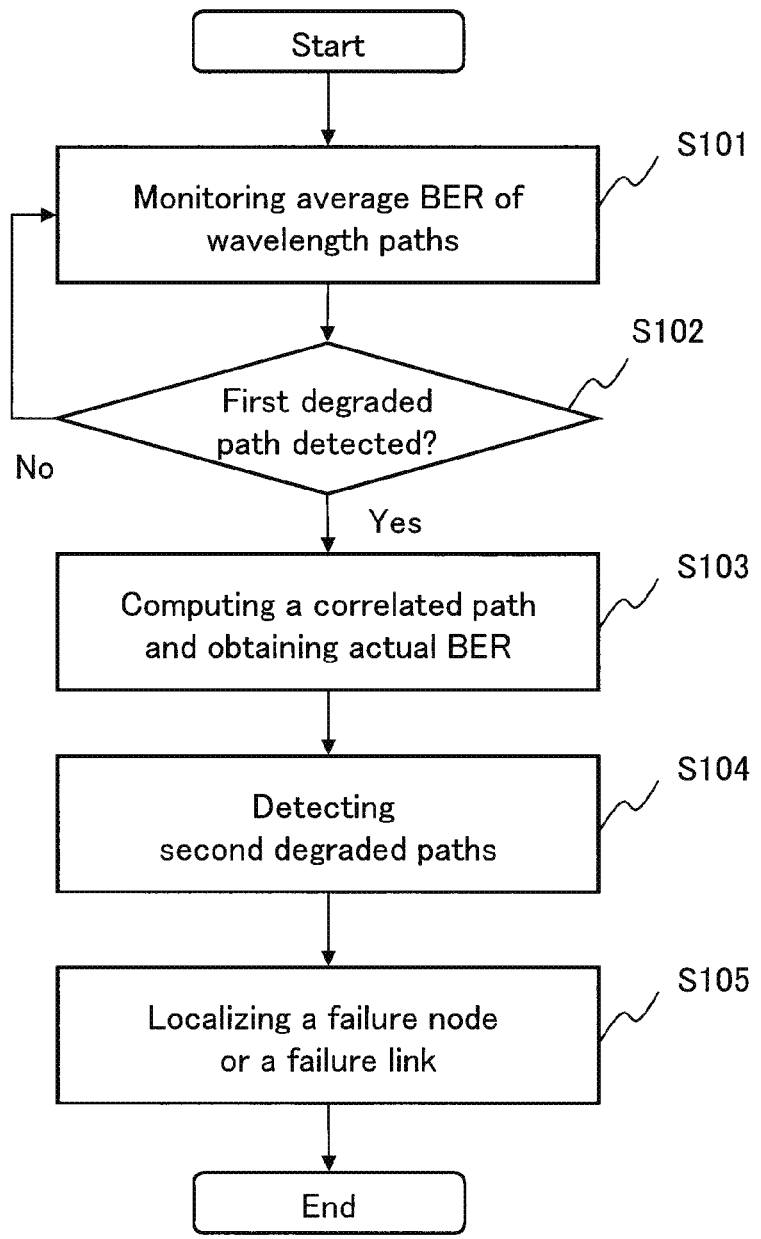
FIG. 10 is showing a flow chart of an operation in the second exemplary embodiment.

By referring to FIG. 10, the operation in the case that the transponder 140 is the transponder without digital coherent transceivers, which is shown in FIG. 7, will be described.

At first, the node 101 monitors average values of BER for each wavelength paths which ends at the node 101 (S101). The transponder 140 in FIG. 7 is able to obtain actual values of BER, when the node 101 is at the end of a wavelength path.

Next, in step S102, the first degradation path detecting unit 400 or the nodal signal degradation management unit 130 detects a first degradation path based on the result of the step S101. The number of the first degradation path may be one or more. If any degraded path is detected, then the node 101 continues to monitor the wavelength paths.

On detecting the first degraded path, step S103 is performed. In S103, the correlation path computation unit 400 computes a correlation path with the first degraded path. Then the correlation path computation unit 400 obtains the actual value of BER of the correlation path from the wavelength path database 800. The number of the correlation path may be one or more.

After the correlation path is computed, then the second degraded path detecting unit 600 detects second degraded paths in step S104. The degraded path detecting unit 600 compares the average value of BER and the actual value of BER for each of the correlation paths, and picks up N paths from the correlation paths. The number N is a predetermined number, which is more than or equal to one. N paths are to be picked up, in descending order in the increased value of the actual value of BER from the average value of BER.

Lastly, the failure localization unit 700 localizes a failure node or a failure link in step S105, by localizing a node or a link which is traversed by all of the first degraded path and the picked-up correlation paths.

Figure 8:
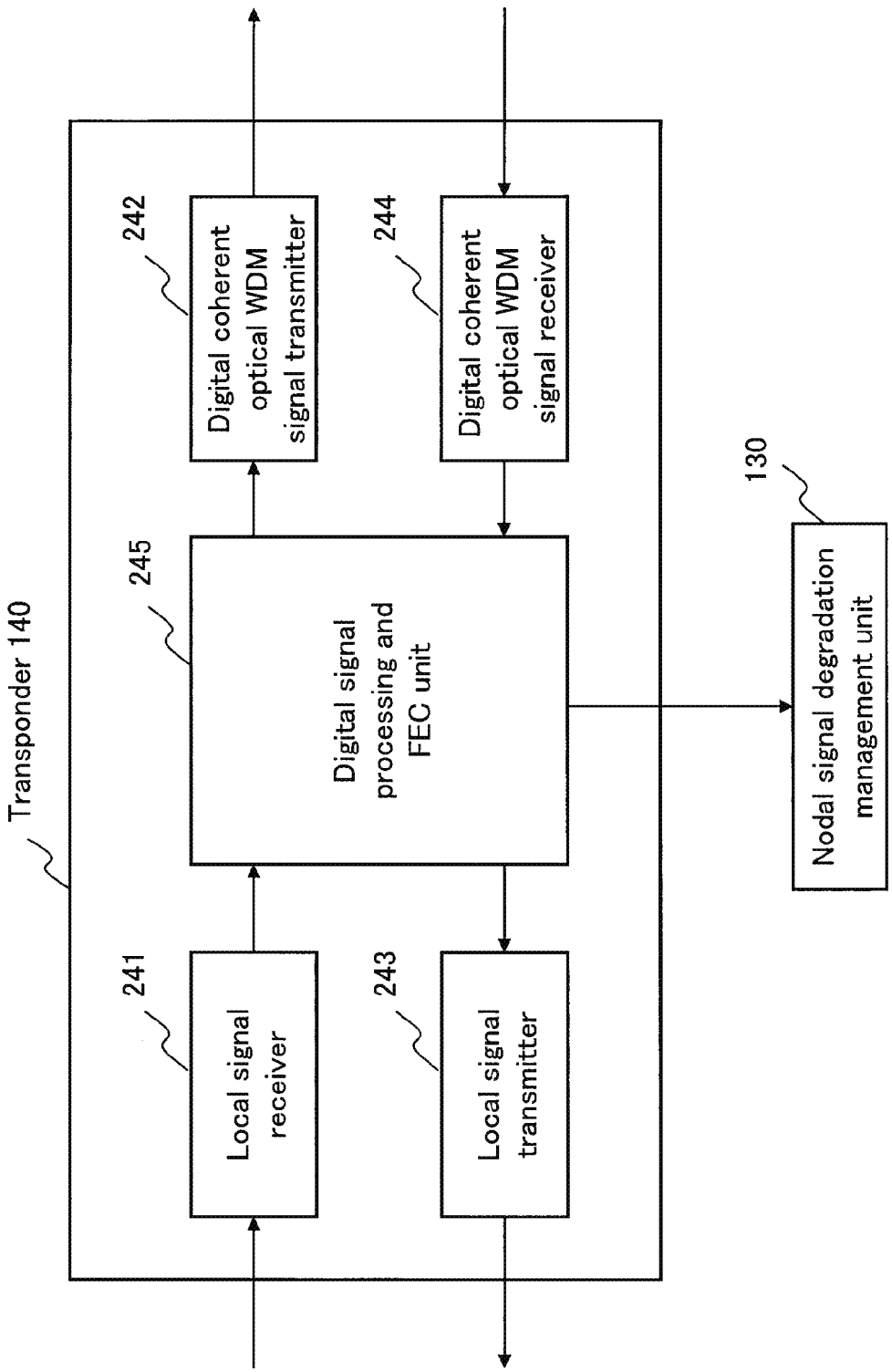
FIG. 8 is a block diagram showing a configuration of a transponder in the second exemplary embodiment, with digital signal processing function.
Figure 11:
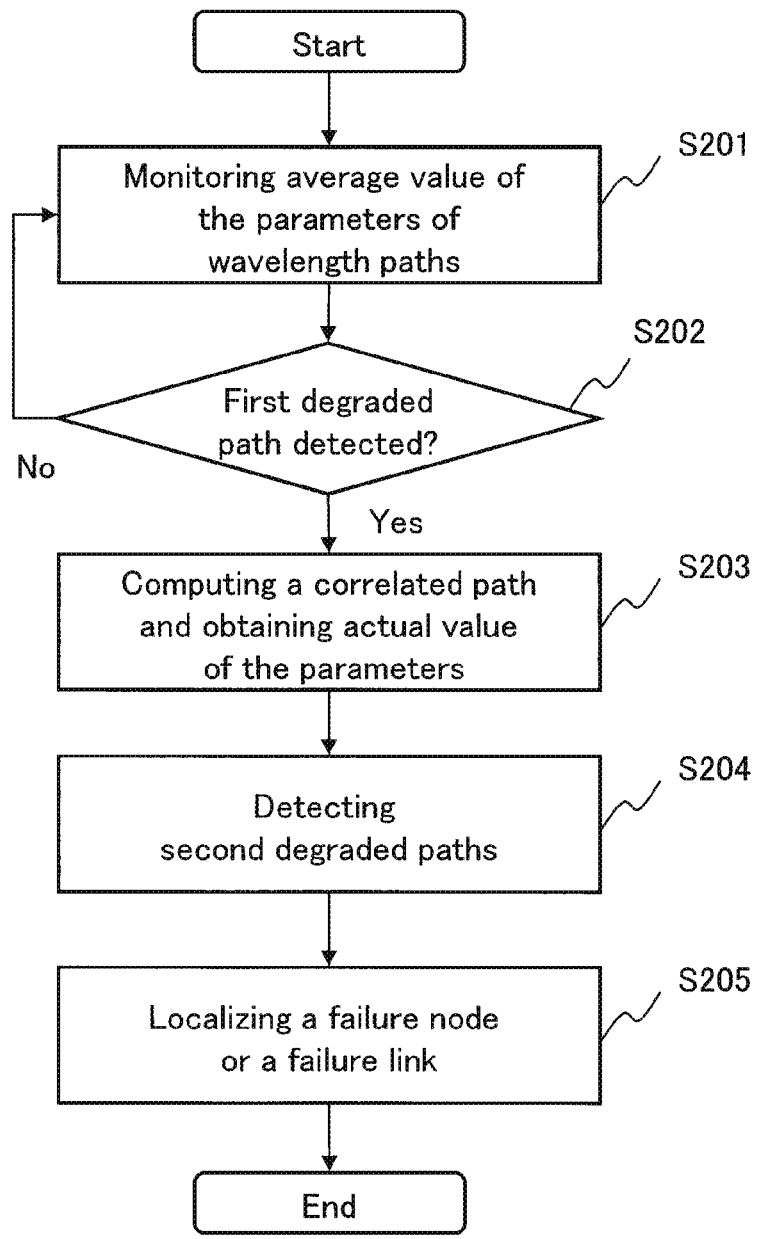
FIG. 11 is showing a flow chart of an operation in the second exemplary embodiment.

By referring to FIG. 11, the operation in the case that the transponder 140 is the transponder with digital coherent transceivers, which is shown in FIG. 8, will be described.

At first, the node 101 monitors average values of BER for each wavelength paths which ends at the node 101 (S201). The node 101 may obtain not only BER, but also parameters such as accumulated CD, PMD, and OSNR, since the transponder 140 in the node 101 is the transponder with digital coherent transceivers.

Next, in step S202, the first degradation path detecting unit 400 or the nodal signal degradation management unit 130 detects a first degradation path based on the result of the step S201. The number of the first degradation path may be one or more. If any degraded path is detected, then the node 101 continues to monitor the wavelength paths.

On detecting the first degraded path, step S203 is performed. In S203, the correlation path computation unit 400 computes a correlation path with the first degraded path. Then the correlation path computation unit 400 obtains the actual value of the parameters of the correlation path from the wavelength path database 800. The number of the correlation path may be one or more.

After the correlation path is computed, then the second degraded path detecting unit 600 detects second degraded paths in step S204. The degraded path detecting unit 600 compares the average value of the parameters and the actual value of the parameters for each of the correlation paths, and picks up N paths from the correlation paths. The number N is a predetermined number, which is more than or equal to one. N paths are to be picked up, in descending order in the increased value of the actual value of one or more parameters, from the average value of one or more parameters.

Lastly, the failure localization unit 700 localizes a failure node or a failure link in step S205, by localizing a node or a link which is traversed by all of the first degraded path and the picked-up correlation paths. Moreover, the failure localization unit 700 figures out what parameters causing the failure, since the node 101 is capable of monitoring a plurality of parameters given above.

(An Example of the Operation)

From the following, an example of failure localization and physical impairment analysis for the failure is performed is to be explained, based on the network and wavelength configuration shown in FIG. 4.

First, the NMS 300 receives a signal degradation failure notification of a wavelength path from one of the nodes 101 to 105. The NMS 300 may receive only the monitored parameters on wavelength paths, but not the failure notification. In the example, it is supposed that the wavelength path in failure is WP-A. Also, it is supposed that the NMS 300 receives the notification from the node 105, which is an end point of WP-A, once the failure in WP-A is detected in the node 105.

Next, the first degradation path detecting unit 400 detects a first degradation path, when the NMS 300 only received the monitored parameters on wavelength paths.

Then, the correlation path computation unit 500 computes to find which wavelength paths pass the links which are also traversed by the first degraded path.

The wavelength path information can be retrieved from the wavelength path database 800. FIG. 12 shows the link table 801 in the wavelength path database 800. The link table 801 shows what links are traversed by WP-A, WP-B, and WP-C, in which "1" means a link is traversed by one of the wavelength path and "0" means not. As shown in FIG. 12, WP-B and WP-C correlate to WP-A with the fiber link (101, 102) and (102, 103), respectively. Therefore, the correlation path computation unit 500 detects WP-B and WP-C are the correlation path of WP-A.

After the wavelength paths, which pass the links traversed by the first wavelength path, are computed, the NMS 300 will retrieve the signal degradation information from the receivers of the correlation paths computed by the path correlation computation unit 500.

In FIG. 4, let WP-B and WP-C have digital coherent transceivers with DSP and FEC unit 245 at both path ends, which are the nodes 102, 103 and 104. As described above, in the DSP and FEC unit 245, physical impairments of CD and PMD can be separated and monitored. Therefore, the degradation information of CD and PMD can be retrieved by the NMS 300. The retrieved degradation information of BER, CD and PMD, which are shown as FIG. 13, is sent to the failure localization computation unit 700.

Finally, based on wavelength path information sent by the correlation path computation unit 500 and signal degradation information of WP-B and WP-C retrieved by the NMS 300, the failure localization unit 700 computes the location at which the signal is degraded to cause bit errors to WP-A.

FIG. 13 shows the parameter table 802, which memorizes average values and actual values of BER, accumulated CD and PMD, for each of the wavelength paths. Although it is not shown in FIG. 13, the parameter table 802 may include the parameters other than BER, accumulated CD and PMD. Parameters which indicate OSNR or nonlinear effects may be included in such parameters.

The average values are average values of the parameters, which are monitored in a long term. The actual values are the values of the parameters which are monitored in a short term.

For example, in WP-A, the average value of BER is $10^{-5}$ and the actual value of BER is $10^{-3}$, respectively. The average value of the accumulated CD is 32000 ps/nm (pico seconds per nano meter), and the actual value of the accumulated CD is 31980 ps/nm. Also, the average value of the PMD is 38 ps, and the actual value of the PMD is 42 ps.

The failure localization unit 700 searches the parameter table 802, for differences between the average values and the actual values of the parameters in the correlation path of WP-A, which are WP-B and WP-C in the example of FIG. 4 and FIG. 13. The failure localization unit 700 then notices a great increase in the actual values from the average values of BER and PMD in WP-B. Therefore, the failure localization unit 700 can localize the place where the failure occurs is the link (101, 102) where both of WP-A and WP-B pass through.

Furthermore, it is noticed that the actual values of PMD increased from the average value, while there are small changes in the actual values of accumulated CD in both of WP-A and WP-B. Therefore, the failure localization unit 700 can notice that PMD is the parameter causing the failure in the link (101, 102). If the actual values in both of PMD and accumulated CD are increased from the average value, the failure localization unit 700 notices that the both of PMD and accumulated CD are causing the failure.

For more simple cause analysis for WP-A, it just check the impartment information (accumulated CD, PMD) retrieved from the WP-A receiver upon a detection of signal degradation failure of WP-A. If an increase of signal degradation (accumulated CD, PMD only or both) is observed from the retrieved signal degradation information, it can be said that the signal of WP-A is degraded at the (101, 102) and it is degraded by the increased physical impairments (CD, PMD only or both), Although the correlation paths of WP-A exist for every links which WP-A passes through in the example of FIG. 4, there may be the links which any of the correlation paths traverse. In that case, it is possible to localize the failure and figure out the cause of the failure, as explained as follows.

Suppose the case that WP-C does not exist in FIG. 4. In such case, if no increase of signal degradation of WP-B is observed, it can be said that the signal of WP-A may be degraded at the link (102, 103). And the cause of its degradation may be determined from WP-A's signal information using the simple cause analysis mentioned above.

Though it is not shown in FIG. 4, if another wavelength path with digital coherent transceivers, such as WP-D, WP-E, . . . WP-X, are set to between various node pairs, the physical impairments causing bit errors to WP-A can be figured out more precisely. That is to say, if each link of WP-A is designed to be passed by other wavelength paths with digital coherent transceivers, precise failure localization can be realized using more correlated path information.

(Variation of the Second Exemplary Embodiment)

In FIG. 3 and FIG. 4, although the NMS 300, the first degradation path detecting unit 400, the correlation path computation unit 500, the second degradation path detecting unit 600, the failure localization unit 700, and the wavelength path database 800 are being as separated units, they may be included in one unit, such as a controller.

Figure 14:
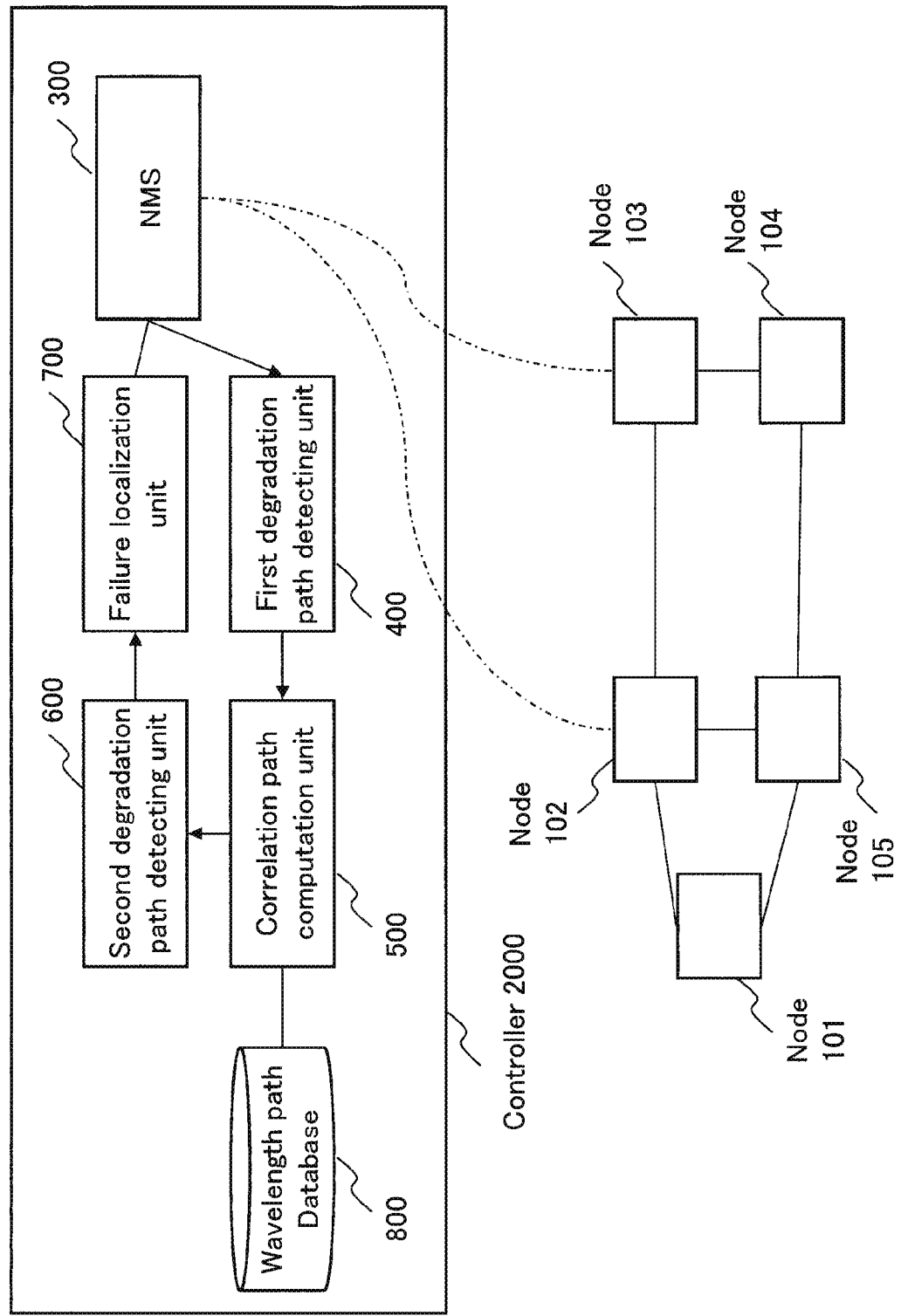
FIG. 14 is a block diagram showing a variation of the communication system in the second exemplary embodiment.

FIG. 14 shows a controller 2000. According to FIG. 14, the controller 2000 includes the NMS 300, the first degradation path detecting unit 400, the correlation path computation unit 500, the second degradation path detecting unit 600, the failure localization unit 700, and the wavelength path database 800.

Descriptions for each of the elements in the controller 2000 and their operations are omitted because their function and operations are the same as the description above.

(Effect Caused by the Second Exemplary Embodiment)

According to the second exemplary embodiment described above, it is possible to localize the failure and figure out what physical impairment causes bit errors without using external optical performance monitors. This is because, first the links at which signals are degraded can be found through the correlation path computation by using the existing wavelength path information; second, to receivers of the correlated wavelength paths with DSP, physical impairments which are to be mitigated can be separated and monitored.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, the operation in each exemplary embodiment mentioned above (operation shown in the flowchart and each sequence chart) can be carried out by hardware, software or a combined configuration of the software and the hardware.

In the case of carrying out a process by software, it may be possible that a program, which records sequence of the processes, is installed in a memory of a computer mounted on dedicated hardware and then, is executed. It may be also possible that the program is installed and executed in a general-purpose computer which can carry out various processes.

For example, it is possible that the program is recorded in advance in a hard disk and ROM (Read Only Memory) as a storage medium. It is also possible that the program is stored (recorded) temporarily or permanently in a removable storage medium such as CD-ROM (Compact Disc Read Only Memory), a MO (Magneto optical) disk, DVD (Digital Versatile Disc), a magnetic disk, a semiconductor memory or the like. It is possible to provide such removable storage medium as so-called packaged software.

Further, it may be possible that the program is installed through being read from the removable storage medium as mentioned above and it may be also possible that the program is transferred by radio from a download site to the computer as other method. It may be also possible that the program is transferred by a wire to the computer via a network such as LAN (Local Area Network) and the internet. It is possible that the computer receives the transferred program, and installs the program in a storage medium such as a built-in hard disk or the like.

Moreover, it is also possible that the system, which has been described in the exemplary embodiment mentioned above, has structure of a logical combination of plural apparatuses, and has a configuration in which functions of each apparatus are intermingled.

The whole or part of the exemplary embodiments disclosed above can be described as, but not limited to, the following supplementary notes.

(Supplementary Note 1)

A controller connected to a network and a plurality of nodes comprising:

a first degraded path detecting means for detecting a wavelength path as a first degraded path, whose quality is detected to be degraded, based on received parameter of wavelength paths in the network;

a correlation path computation means for computing a correlation path which is correlated to the first degraded path;

a second degraded path detecting means for detecting a second degraded path from the correlation path; and a failure localization means for localizing a node or a link connecting nodes as a failure node or a failure link, wherein the node or the link are traversed by both of the first degraded path and the second degraded path.

(Supplementary Note 2)

The controller according to supplementary note 1, wherein the second degraded path detecting means detects the second degraded path based on a computation of a difference between an average value and an actual value of the parameter.

(Supplementary Note 3)

The controller according to supplementary note 1 or 2, wherein the second degraded path detecting means detects a predetermined number of the second degraded paths in descending order in the difference between the average value and the actual value of the parameter.

(Supplementary Note 4)

The controller according to any one of supplementary notes 1 to 3, wherein the first degraded path detecting means detects the first degraded path based on an average value of BER (Bit Error Rate) for each wavelength paths.

(Supplementary Note 5)

The controller according to any one of supplementary notes 1 to 4, wherein the parameter includes at least one of accumulated CD (Chromatic Dispersion), PMD (Polarization Mode Dispersion), OSNR (Optical Signal Noise Ratio) and BER.

(Supplementary Note 6)

A communication system comprising:

a network including a plurality of nodes connected each other by a link;

a monitoring means for monitoring parameter related to quality of wavelength paths through the nodes;

a first degraded path detecting means for detecting a wavelength path as a first degraded path, whose quality is detected to be degraded, based on the parameter monitored;

a correlation path computation means for computing a correlation path which is correlated with the first degraded path;

a second degraded path detecting means for detecting a degraded path as a second degraded path from the correlation path; and a failure localization means for localizing a node or a link as a failure node or a failure link, wherein the node or the link are traversed by both of the first degraded path and the second degraded path.

(Supplementary Note 7)

The communication system according to supplementary note 6, wherein the second degraded path detecting means detects the second degraded path based on a computation of a difference between an average value and an actual value of the parameter.

(Supplementary Note 8)

The communication system according to supplementary note 6 or 7, wherein the second degraded path detecting means detects a predetermined number of the second degraded paths in descending order in the difference between the average value and the actual value of the parameter.

(Supplementary Note 9)

The communication system according to any one of supplementary notes 6 to 8, wherein the first degraded path detecting means detects the first degraded path based on an average value of BER (Bit Error Rate) for each wavelength paths.

(Supplementary Note 10)

The communication system according to any one of supplementary notes 6 to 9, wherein the parameter includes at least one of accumulated CD (Chromatic Dispersion), PMD (Polarization Mode Dispersion), OSNR (Optical Signal Noise Ratio) and BER.

(Supplementary Note 11)

A communication method comprising:

detecting a wavelength path as a first degraded path, whose quality is detected to be degraded, based on received parameter of wavelength paths in a network;

computing a correlation path which is correlated to the first degraded path;

detecting a second degraded path from the correlation path; and localizing a node or a link connecting nodes as a failure node or a failure link, wherein the node or the link are traversed by both of the first degraded path and the second degraded path.

(Supplementary Note 12)

The communication method according to supplementary note 11, wherein the second degraded path is detected based on a computation of a difference between an average value and an actual value of the parameter.

(Supplementary Note 13)

The communication method according to supplementary note 11 or 12, wherein a predetermined number of the second degraded paths are detected in descending order in the difference between the average value and the actual value of the parameter.

(Supplementary Note 14)

The communication method according to any one of supplementary notes 11 to 13, wherein the first degraded path is detected based on an average value of BER (Bit Error Rate) for each wavelength paths.

(Supplementary Note 15)

The communication method according to any one of supplementary notes 11 to 14, wherein the parameter includes at least one of accumulated CD (Chromatic Dispersion), PMD (Polarization Mode Dispersion), OSNR (Optical Signal Noise Ratio) and BER.

(Supplementary Note 16)

A storage medium for storing a communication program comprising:

a first degraded path detecting process for detecting a wavelength path as a first degraded path, whose quality is detected to be degraded, based on received parameters of wavelength paths in the network;

a correlation path computation process for computing a correlation path which is correlated to the first degraded path;

a second degraded path detecting process for detecting a second degraded path from the correlation path; and a failure localization process for localizing a node or a link connecting nodes as a failure node or a failure link, wherein the node or the link are traversed by both of the first degraded path and the second degraded path.

(Supplementary Note 17)

The storage medium for storing a communication program according to supplementary note 16, wherein the second degraded path detecting process detects the second degraded path based on a computation of a difference between an average value and an actual value of the parameter.

(Supplementary Note 18)

The storage medium for storing a communication program according to supplementary note 16 or 17, wherein the second degraded path detecting process detects a predetermined number of the second degraded paths in descending order in the difference between the average value and the actual value of the parameter.

(Supplementary Note 19)

The storage medium for storing a communication program according to any one of supplementary notes 16 to 18, wherein the first degraded path detecting process detects the first degraded path based on an average value of BER (Bit Error Rate) for each wavelength paths.

(Supplementary Note 20)

The storage medium for storing a communication program according to any one of supplementary notes 16 to 19, wherein the parameter includes at least one of accumulated CD (Chromatic Dispersion), PMD (Polarization Mode Dispersion), OSNR (Optical Signal Noise Ratio) and BER.

REFERENCE SIGNS LIST

101, 102, 103, 104, 105 Node
110 Wavelength path switch
120 Nodal control unit
130 Nodal signal degradation management unit
131 Signal degradation database
132 Failure detection unit
140 Transponder
141, 241 Local signal receiver
142 Non-digital coherent WDM signal transmitter
143, 243 Local signal transmitter
144 Non-digital coherent WDM signal receiver
145 FEC unit
242 Digital coherent optical WDM signal transmitter
244 Digital coherent optical WDM signal receiver
245 Digital signal processing and FEC unit
300 NMS
400, 1001 First degraded path detecting unit
500, 1002 Correlation path computation unit
600, 1003 Second degraded path detecting unit
700, 1004 Failure localization unit
800 Wavelength path database
801 Link table
802 Parameter table
1000, 2000 Controller

What is claimed is:

1. A controller connected to a network and a plurality of nodes comprising:
   a first degraded path detecting unit that detects a wavelength path as a first degraded path, whose quality is detected to be degraded, based on received parameter of wavelength paths in the network;
   a correlation path computation unit that computes a correlation path which is correlated to the first degraded path;
   a second degraded path detecting unit that detects a second degraded path, which is different from the first degraded path, from the correlation path; and
   a failure localization unit that localizes a node or a link connecting nodes as a failure node or a failure link, wherein the node or the link are traversed by both of the first degraded path and the second degraded path.

2. The controller according to claim 1,
   wherein the second degraded path detecting unit-detects the second degraded path based on a computation of a difference between an average value and an actual value of the parameter.

3. The controller according to claim 1,
   wherein the second degraded path detecting unit detects a predetermined number of the second degraded paths in descending order in the difference between the average value and the actual value of the parameter.

4. The controller according to claim 1,
   wherein the first degraded path detecting unit-detects the first degraded path based on an average value of BER (Bit Error Rate) for each wavelength paths.

5. The controller according to claim 1,
   wherein the parameter includes at least one of accumulated CD (Chromatic Dispersion), PMD (Polarization Mode Dispersion), OSNR (Optical Signal Noise Ratio) and BER.

6. A communication system comprising:
   a network including a plurality of nodes connected each other by a link;
   a monitoring unit that monitors parameter related to quality of wavelength paths through the nodes;
   a first degraded path detecting unit that detects a wavelength path as a first degraded path, whose quality is detected to be degraded, based on the parameter monitored;
   a correlation path computation unit that computes a correlation path which is correlated with the first degraded path;
   a second degraded path detecting unit that detects a degraded path as a second degraded path, which is different from the first degraded path, from the correlation path; and
   a failure localization unit that localizes a node or a link as a failure node or a failure link, wherein the node or the link are traversed by both of the first degraded path and the second degraded path.

7. The communication system according to claim 6,
   wherein the second degraded path detecting unit detects the second degraded path based on a computation of a difference between an average value and an actual value of the parameter.

8. The communication system according to claim 6,
   wherein the second degraded path detecting unit detects a predetermined number of the second degraded paths in descending order in the difference between the average value and the actual value of the parameter.

9. The communication system according to claim 6,
   wherein the first degraded path detecting unit detects the first degraded path based on an average value of BER (Bit Error Rate) for each wavelength paths.

10. The communication system according to claim 6,
    wherein the parameter includes at least one of accumulated CD (Chromatic Dispersion), PMD (Polarization Mode Dispersion), OSNR (Optical Signal Noise Ratio) and BER.

11. A communication method comprising:
    detecting a wavelength path as a first degraded path, whose quality is detected to be degraded, based on received parameter of wavelength paths in a network;
    computing a correlation path which is correlated to the first degraded path;
    detecting a second degraded path, which is different from the first degraded path, from the correlation path; and
    localizing a node or a link connecting nodes as a failure node or a failure link, wherein the node or the link are traversed by both of the first degraded path and the second degraded path.

12. The communication method according to claim 11,
    wherein the second degraded path is detected based on a computation of a difference between an average value and an actual value of the parameter.

13. The communication method according to claim 11,
    wherein a predetermined number of the second degraded paths are detected in descending order in the difference between the average value and the actual value of the parameter.

14. The communication method according to claim 11,
    wherein the first degraded path is detected based on an average value of BER (Bit Error Rate) for each wavelength paths.

15. The communication method according to claim 11,
    wherein the parameter includes at least one of accumulated CD (Chromatic Dispersion), PMD (Polarization Mode Dispersion), OSNR (Optical Signal Noise Ratio) and BER.

16. A non-transitory storage medium for storing a communication program comprising:
    a first degraded path detecting process for detecting a wavelength path, as a first degraded path, whose quality is detected to be degraded, based on received parameters of wavelength paths in the network;
    a correlation path computation process for computing a correlation path which is correlated to the first degraded path;
    a second degraded path detecting process for detecting a second degraded path, which is different from the first degraded path, from the correlation path; and
    a failure localization process for localizing a node or a link connecting nodes as a failure node or a failure link, wherein the node or the link are traversed by both of the first degraded path and the second degraded path.

17. The non-transitory storage medium for storing a communication program according to claim 16,
    wherein the second degraded path detecting process detects the second degraded path based on a computation of a difference between an average value and an actual value of the parameter.

18. The non-transitory storage medium for storing a communication program according to claim 16,
    wherein the second degraded path detecting process detects a predetermined number of the second degraded paths in descending order in the difference between the average value and the actual value of the parameter.

19. The non-transitory storage medium for storing a communication program according to claim 16,
 wherein the first degraded path detecting process detects the first degraded path based on an average value of BER (Bit Error Rate) for each wavelength paths.

20. The non-transitory storage medium for storing a communication program according to claim 16,
 wherein the parameter includes at least one of accumulated CD (Chromatic Dispersion), PMD (Polarization Mode Dispersion), OSNR (Optical Signal Noise Ratio) and BER.

* * * * *